Patented Feb. 28, 1950

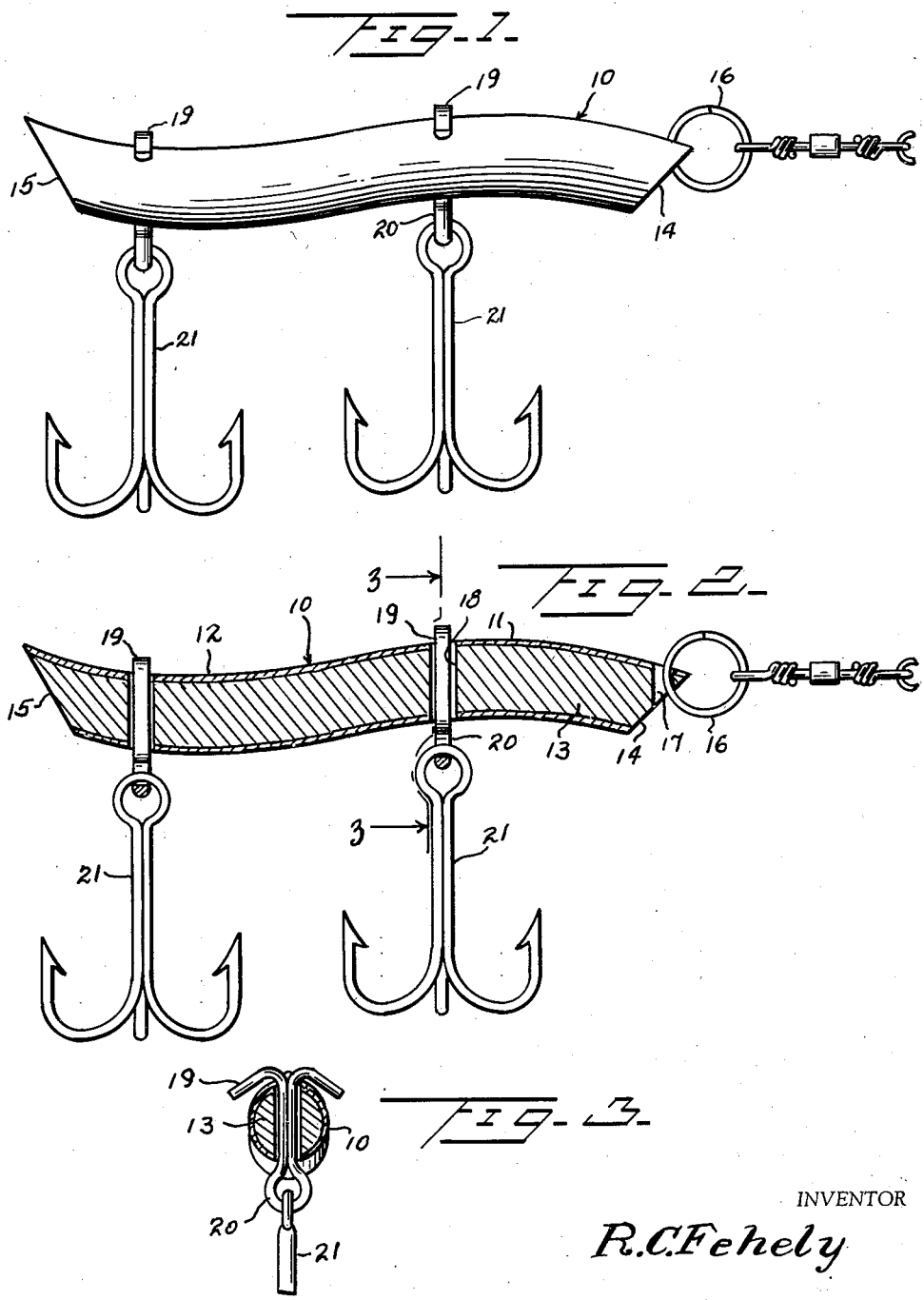

2,498,800

UNITED STATES PATENT OFFICE 2,498,800

FISHING PLUG

Ralph C. Fehely, Arcata, Calif.

Application March 24, 1947, Serial No. 736,813

1 Claim. (Cl. 43—42.45)

This invention relates to fish lure.

An object of this invention is to provide a fish lure which is designed for bottom or deep fishing and which will assume a zig-zag or undulated course in its movement through the water.

Another object of this invention is to provide a fish lure which will withstand hard usage such as that encountered in the fishing for ling cod, black cod, rock cod, capezones, and other fish which feed at or near the bottom of the water. The outer surface of the plug is adapted to be coated to provide a bright surface to which the fish are attracted in the zig-zag or undulating motion of the lure, and the lure is formed by filling a copper or other non-corrosive metal tube bent on an ogee curvature with lead or other fairly heavy material so that the lure will be non-buoyant.

With the above and other objects in view, my invention consists in the arrangement, combination and details of construction disclosed in the drawings and specification, and then more particularly pointed out in the appended claim.

In the drawing:

Figure 1 is a detailed side elevation of a fishing plug or lure constructed according to an embodiment of this invention.

Figure 2 is a longitudinal section of the lure.

Figure 3 is a transverse section taken on the line 3—3 of Figure 2.

Referring to the drawing the numeral 10 designates generally a tubular lure member which is formed on an ogee or S curvature and is formed with an upwardly curved forward portion 11 and a reversely or downwardly curved rear portion 12. The interior of the tubular member 10 is filled with lead or other relatively heavy material as indicated at 13 so that the lure will be non-buoyant. The lure at the forward end thereof is provided with a flat face 14 which is inclined downwardly and rearwardly and is formed at its rear end with a second flat face 15 which is inclined downwardly and forwardly.

A swivel attaching ring 16 is extended through an opening 17 formed in the forward end of the lure for attaching a line thereto. The tubular member 10 and the filling 13 are provided with a pair of vertically disposed openings 18 through which a pair of hook attaching members 19 are loosely extended, the attaching means 19 in the present instance being constructed in the form of cotter pins or the like which have the eyes 20 thereof lowermost.

A multiple hook 21 is carried by each fastening member 19 and is disposed in depended relation below the lure body.

The tubular member 10 is preferably formed out of copper or other non-corrosive tubing and may be plated with a bright coating so as to present an appearance which will be attractive to the fish.

I do not mean to confine myself to the exact details of construction herein disclosed, but claim all variations falling within the purview of the appended claim.

What I claim is:

A fish lure comprising an elongated round body longitudinally curved between the ends thereof to form a substantially S-shaped plug, the opposite ends of said body being flat and disposed in downwardly converging relation, said body having a pair of longitudinally spaced apart openings therethrough, a pair of hooks below said body, and means loosely engaging through said openings dependingly securing said hooks to said body.

RALPH C. FEHELY.

REFERENCES CITED

The following references are of record in the file of this patent:

UNITED STATES PATENTS

| Number | Name | Date |
| --- | --- | --- |
| 1,472,638 | Dickman | Oct. 30, 1923 |
| 1,582,171 | Foss | Apr. 27, 1926 |
| 1,745,006 | Chapleau | Jan. 28, 1930 |
| 1,755,047 | Braidwood | Apr. 15, 1930 |
| 1,898,740 | Novitzky | Feb. 21, 1933 |
| 1,993,798 | Peterson | Mar. 12, 1935 |
| 2,159,230 | Sage | May 23, 1939 |